United States Patent [19]

Kogure

[11] 4,130,431

[45] Dec. 19, 1978

[54] METAL SURFACE TREATMENT LIQUID AND RUST PREVENTIVE PAINT

[75] Inventor: Hideo Kogure, Hiratsuka, Japan

[73] Assignee: Kansai Paint Co., Ltd., Japan

[21] Appl. No.: 815,532

[22] Filed: Jul. 5, 1977

[30] Foreign Application Priority Data

Jul. 5, 1976 [JP] Japan .................................. 51-80276
Sep. 8, 1976 [JP] Japan ................................ 51-107531

[51] Int. Cl.² ............................................. C09D 5/08
[52] U.S. Cl. .............................. 106/14.33; 106/14.39; 106/287.16; 106/287.19; 148/6.15 R; 252/79.2; 260/45.75 F
[58] Field of Search ..................... 148/6.15 R; 106/14, 106/14.33, 14.39, 287.16, 287.19; 252/79.2, 387; 260/45.75 F

[56] References Cited

U.S. PATENT DOCUMENTS

| 2,294,571 | 9/1942 | Remy ............................... 148/6.15 R |
| 4,017,334 | 4/1977 | Matsushima et al. ........... 148/6.15 R |

*Primary Examiner*—Lorenzo B. Hayes
*Attorney, Agent, or Firm*—Ostrolenk, Faber, Gerb & Soffen

[57] ABSTRACT

According to one of the two aspects of the present invention, a metal surface treatment liquid having pH of less than 6 and containing oxytitanic ion and/or peroxytitanic ion therein is provided. The second aspect of the present invention is to provide a rust preventive paint, in which oxytitanic ion and/or peroxytitanic ion is(are) contained.

6 Claims, No Drawings

METAL SURFACE TREATMENT LIQUID AND RUST PREVENTIVE PAINT

In the first place the present invention relates to a novel metal surface treatment liquid containing oxytitanic ion and/or peroxytitanic ion therein.

Hitherto, a composition containing chromic acid ion has been known as a metal surface treatment liquid and the process of contacting it with the metal surface has been taken but an innoxious metal surface treatment liquid without containing chrome compound has been desired in terms of safety and sanitation, because the former contains hexavalent chromium ions which are harmful to human body. Those compositions using phosphates are known as metal surface treatment liquids without containing hexavalent chromium ions but they have drawbacks in properties such as corrosion resistance, etc.

The present inventor has earnestly repeated studies in search for a metal surface treatment liquid which exercises an equivalent or greater surface treatment effect without using noxious chrome compounds as compared with the metal surface treatment liquid which uses conventional chrome compounds First of all, the present inventor noticed that metal alloy containing titanium compound or metal titanium displays very excellent properties in corrosion resistance, heat resistance and mechanical strength. Recently, a metallization of titanium compound or metal titanium has been studied but it has not yet been put to practical use since there are such defects as the high spraying temperature and poor adhesive property to metals.

The present inventor has revealed the following result: When the metal surface treatment liquid containing oxytitanic ion and/or peroxytitanic ion is applied to a metal substrate, titanic acid resulting from the reduction of the oxytitanic ion or peroxytitanic ion react with the metal substrate to form a composite oxide film thereon. The composite oxide film thus obtained is superior in water resisting property, corrosion resisting property, mechanical strength and adhesive property to coated film, etc.

In other words, the present invention relates to the metal surface treatment liquid having pH of less than 6 in which contains oxytitanic ion ($TiO^{2+}$) and/or peroxytitanic ion ($TiO_2^{2+}$).

Secondly, the present invention relates to an especially desirable corrosion resisting paint as a temporary protective paint superior in adhesiveness to finishing paint, showing excellent corrosion resistance for a long period and further giving a film having no effect on welding and gas cutting.

Conventionally, etching primer, and inorganic or organic zinc rich paints have been known as a temporary protective paint.

Out of these paints, the etching primer contains butyral resin or phenol resin as a binder, chromate pigments such as zinc chromate, lead chromate, etc. as a anti-corrosive pigment and rust preventive additives such as phosphoric acid, etc. Although the film of this primer has no effect on welding of the metal substrate and has excellent adhesiveness to finishing paint, it shows poor weatherability, forming rust within 1 - 3 months and furthermore it is not preferable in terms of safety and sanitation because it contains harmful hexavalent chromium ions.

Although the outdoor weatherability may be improved making film a thick one, this causes poor drying property and adhesiveness to finishing paint and also weldability and gas cutting property of metal substrate are deteriorated.

An organic or inorganic zinc rich paint has usually excellent rust resisting property for more than six months of outdoor exposure but weldability and gas cutting property of the coated metal substrate are poor. Especially in the case of high content of zinc dust, a so-called blow-hole is formed so that the mechanical strength of the welded part is deteriorated.

The present inventor has reached this invention by discovering that a rust preventive paint containing oxytitanic ion or peroxytitanic ion has excellent water resistance, corrosion resistance, mechanical strength, adhesiveness to finishing paint, etc. as a result of repeated earnest study for the purpose of obtaining a rust preventive paint with excellent outdoor weatherability, good adhesiveness to finishing paint and having no effect on weldability and gas cutting property of metal substrate without containing harmful chrome or lead compounds.

In other words, the present invention relates to a rust preventive paint containing oxytitanic ion ($TiO^{2+}$) and/or peroxytitanic ion($TiO_2^{2+}$) therein.

The oxytitanic ion($TiO^{2+}$) and peroxytitanic ion ($TiO_2^{2+}$) used in the present invention can be obtained by dissolving titanium compound or metal titanium in an acid solution and then, if necessary, oxidizing it. Titanium compound or metal titanium may be added to the acid solution containing peroxide to obtain said oxytitanic ion and peroxytitanic ion.

As titanium compounds to be used herein, the following may be mentioned:

Barium titanate, iron titanate, calcium titanate magnesium titanate, aluminum titanate, zinc titanate, lead titanate, titanium tetrachloride, titanium trichloride, titanium dichloride, titanium monoxide, titanium dibromide, titanium diiodide, titanium sesquioxide, titanium trifluoride, titanium tribromide, titanium triiodide, titanium sulfate, titanium dioxide, titanium tetrafluoride, titanium tetrabromide, titanium tetraiodide, titanium sulfate, fluotitanous acid potassium fluotitanate, sodium fluotitanate, ammonium fluotitanate, alkyl ($C_1$ - $C_6$) titanate, etc.

As the acids to be used herein, inorganic acids such as hydrochloric acid, hydrofluoric acid, chloric acid, perchloric acid, sulfuric acid, sulfurous acid, pyrosulfuric acid, nitric acid, nitrous acid, phosphoric acid, pyrophosphoric acid, metaphosphoric acid, etc. can be used.

Although it is possible oxidize titanium compound or metal titanium dissolved in the acid solution by standing said dissolved material in the air or by blowing air or oxygen therein, it is advisable to add peroxides in order to perform the oxidation reaction quickly. As said peroxides, one or more of zinc peroxide, magnesium peroxide, calcium peroxide, barium peroxide hydrogen peroxide, etc. may be used. Out of these, hydrogen peroxide is especially preferable.

In the abovementioned reaction, oxytitanic ion can be obtained by merely dissolving them in acid in case of using barium titanate, iron titanate, calcium titanate, magnesium titanate, aluminum titanate, lead titanate and titanium sulfate as titanium compound but further oxidation is necessary for obtaining peroxytitanic ion. Also, it is possible to obtain a solution of oxytitanic ion and/or peroxytitanic ion without precipitation by gradually adding the alkyl titanate into the mixture solution having a temperature of below 10° C of the acids and the peroxides (preferably, hydrogen peroxyde), in the case of using the alkyl titanate. In this case, when the alkyl titanate is not added gradually or the reaction temperature rises over 10° C, precipitation of a great quantity of sparingly water-soluble titanium dioxide is caused so that a desirable oxytitanic ion and/or peroxytitanic ion cannot be obtained.

Comparing oxytitanic ion with peroxytitanic ion in the present invention, the peroxytitanic ion is preferable as the peroxytitanic ion has higher activity that the former to metal substrate.

In these manufacturing methods, colorless oxytitanic ion is easily formed in the pH range of less than 6 and peroxytitanic ion is also likely to be formed within the pH range of less than 6 and is orange-colored (red brown in case of high concentration). Also, the pH of the metal surface treatment liquid should be in the range of less than 6 preferably, 0 to 3.5. When pH is over 6, oxytitanic ion and/or peroxytitanic ion are unable to exist stably and the surface treatment liquid cannot show surface treatment effect sufficiently as sparingly water-or acid-soluble titanium dioxide is deposited from the treatment liquid during long time storage and the concentration of oxytitanic ion and/or peroxytitanic ion becomes small.

On the other hand, pH of the rust preventive paint of the present invention should be in the range of less than 6, preferably 0 to 3.5. When pH exceeds 6, oxytitanic ion and peroxytitanic ion cannot stably exist, so that the paint does not show the desired rust preventiveness as the concentration of oxytitanic ion and/or peroxytitanic ion becomes less while sparingly water-or-soluble titanium dioxide is deposited in the paint.

In the case of the metal surface treatment liquid, each oxytitanic ion or peroxytitanic ion may be independently contained or both may be mixed. The concentration of these ions is preferably within the range of 0.0025 to 2.5 ion mol in 1,000 g of the surface treatment liquid. In the case of less than 0.0025 ion mol, it is impossible to perform sufficient metal surface treatment as the amount of oxytitanic ion and/or peroxytitanic ion is small. On the other hand, when it is over 2.5 ion mol, the desired thickness of surface treatment film is unable to be obtained as it is difficult to adjust the thickness of the metal surface treatment film.

The metal surface treatment liquid obtained by the abovementioned manufacturing method is used as it is as long as concentration of the ion is within the abovementioned range. The unreacted titanium compounds or metal titanium may be contained in its surface treatment liquid.

On the other hand, in the case of rust preventive paint, oxytitanic ion or preoxytitanic ion may be contained alone or both of them may be contained as a mixture. The concentration of these ions is preferably within the range of 0.0025 to 2.5 ion mol against 1,000 g of the paint. In the case of less than 0.0025 ion mol, it does not show sufficient rust preventing property. On the other hand, in the case of more than 2.5, it gives poor adhesiveness and overcoatability as the unreacted oxytitanic ion and/or peroxytitanic ion remain(s) in the painted film. In the present invention, the unreacted titanium compounds or metal titanium may be contained in the paint.

The rust preventive paint of the present invention is obtained by adding the proper quantity of organic solvent for paint and the solution containing oxytitanic ion and/or peroxytitanic ion to conventional resin for paint vehicles such as butyral resin, alkyd resin, phenoxy resin, polybutadiene, phenolic resin, epoxy resin, acrylic resin, etc. Furthermore, if necessary, the paint may contain bodies such as silica powder, mica, talc, carbon black, iron black, red iron oxide, alumina barium sulfate, etc. as well as coloring pigments.

As a method of treating surface of metal substrate by using the metal surface treatment liquid of the present invention, it is enough to air dry or heat dry after contacting metal surface with the treatment liquid by dipping, spraying, electrodepositing, etc. and then, if necessary, washing with water. Although the treating time of the metal surface depends upon the concentration of oxytitanic ion and/or peroxytitanic ion and the thickness of film to be obtained, usually it ranges from about 0.1 to 10 minutes.

On the other hand, spraying and brushing may be ordinarily used as coating method in the case of the rust preventive paint of the present invention.

It is possible treat and coat metal substrates such as steel, galvanized steel, tinned steel, aluminum, copper, etc. by using the surface treatment liquid and the rust preventive paint of the present invention, and it is also possible to improve such properties of the metal surface as corrosion resistance, heat resistance, acid resistance, alkali resistance, hydrophilic property, adhesiveness of paint, etc.

The metal surface treatment liquid of the present invention does not contain harmful metals such as hexavalent chromium ion, etc. The control of the coating bath is easy. The residual oxytitanic ion and/or peroxytitanic ion can be withdrawn as titanium dioxide with precipitation because the pH of waste treatment liquid rises with dilution in the case of washing by water after being coated.

The paint of the present invention does not also contain harmful metal such as hexavalent chromium ion, etc., and forms a continuous composite oxide film of the titanic acid on the metal substrate, and then a paint film with excellent property is formed on the composite oxide film. In case of using the paint of the present invention as a temporary protective paint, the thickness of the painted film may be generally about 15 to 30 $\mu$ and the film has good adhesion to the finishing paint as well as excellent rust resisting property. Also, the weldability and gas cutting property of the painted metal substrate are not deteriorated. In a rust preventive paint other than the temporary protective paint, the thickness of the film may be usually over 40 $\mu$, and the thicker the film, the better the exposure rust preventive property for a long time.

Furthermore, the paint of the present invention may be applied to rusted steel.

For a better understanding of this invention, examples are given below, in which parts and percentages are all by weight.

EXAMPLE 1

Twelve parts of magnesium titanate were added into 63 parts of 75% aqueous solution of sulfuric acid and dissolved in at 80° C. After the obtained solution were cooled to the room temperature, the solution was diluted with 800 parts of distilled water and 125 parts of isopropyl alcohol. Thus a metal surface treatment liquid having pH of 0 and concentration of 0.1 mol oxytitanic ion per 1000 g of the liquid was obtained.

EXAMPLE 2

35 parts of 35% hydrogen peroxide were added to 3 parts of 35% aqueous solution of hydrochloric acid and the solution was kept below 10° C. 50 parts of tetrabutyl titanate were dropped into the solution in the course of 30 minutes with stirring and 500 parts of water of 5° C was dropped in the course of 10 minutes. Then 50 parts of butyl tetratitanate were added dropwise in the course of 60 minutes, and then 360 parts of ethyl alcohol of 5° C were added and the mixture obtained was stirred for 20 minutes. Thus a red brown metal surface treatment liquid having pH of 2 and a concentration of 0.295 mol peroxytitanic ion per 1000 g of the liquid was obtained.

EXAMPLE 3

12.0 parts of magnesium titanate were added to 60 parts of 70% sulfuric acid. The mixture was heated at 80° C for 2 hours to obtain a sulfuric acid solution in which magnesium titanate was completely dissolved. After the solution was cooled to room temperature, 200 parts of ethylene glycol monoethyl ether, 700 parts of distilled water and 28 parts of titanium dioxide were added to the solution and mixed. Thus a metal surface treatment liquid having pH of 0.1 and concentration of 0.1 mol peroxytitanic ion per 1000 g of the liquid was obtained.

Comparative Example 1

50 parts of zinc peroxide was added to 80 parts of phosphoric acid solution adjusted to pH 6.5 and furthermore 50 parts of titanium dioxide was added thereto with stirring at room temperature. Reaction was made for 16 hours but titanium dioxide was not dissolved into the solution and metal surface treatment liquid containing oxytitanic ion was not obtained.

EXAMPLE 4

13.5 parts of barium titanate was dissolved in a mixed solution consisting of 5 parts of 15% aqueous phosphoric acid solution and 9 parts of 20% aqueous hydrogen peroxide solution with stirring for 3 hours at room temperature. Thus, a solution containing oxytitanic ion and peroxytitanic ion (less than 2.182 mol ion per 1000 g of the solution) and barium titanate dispersed therein was obtained.

The following components were premixed and the mixture was dispersed by ball mill for 24 hours to obtain a base paint.

| Base paint formula: | |
|---|---|
| Hitanol PP#1131 (Trade mark of phenolic resin made by Hitachi Chemical Co., Ltd., Japan) | 1.0 part |
| Denka Butyral BV#2000L (Trade mark of butyral resin made by Asahi Denka Co., Ltd., Japan) | 8.0 parts |
| Isopropyl alcohol | 32.0 parts |
| Toluene | 27.0 parts |
| Carbon black | 0.5 part |
| Titanium dioxide | 4.0 parts |

Then, 72.5 parts of the base paint were mixed with 27.5 parts of the above solution to prepare a rust preventive paint of the present invention. The pH of the paint obtained was 0.5. The concentration of oxytitanic ion and peroxytitanic ion in the paint was 0.600 mol ion per 1000 g of the paint.

EXAMPLE 5

9 parts of magnesium titanate were dissolved in a mixed solution consisting of 0.3 parts of 10% aqueous phosphoric acid solution and 5.2 parts of 20% aqueous hydroperoxide solution with stirring for 3 hours at room temperature. Thus, a solution containing oxytitanic ion and peroxytitanic ion (less than 5.172 mol ion per 1000 g of the solution) and magnesium titanate dispersed therein was obtained.

The following components were premixed and the mixture was dispersed by ball mill for 12 hours to obtain a base paint.

| Base paint formula: | |
|---|---|
| Epikote #1007 (Trade mark of epoxy resin made by Shell Chemical Co., England) | 10.0 parts |
| Methyl isobutyl ketone | 20.0 parts |
| Ethyleneglycol monoethyl ether | 23.0 parts |
| Silica powder | 3.0 parts |
| Mica powder | 2.0 parts |
| Red iron oxide | 1.0 parts |
| Toluene | 23.0 parts |

Then, 82.0 parts of the base paint were mixed with 14.5 parts of the above solution to prepare a rust preventive paint of the present invention. The pH of the paint obtained was 2.6. The concentration oxytitanic ion and peroxytitanic ion in the paint was 0.777 mol ion per 1000 g of the paint.

EXAMPLE 6

0.1 part of tetrabutyl titanate was added dropwise into a mixed solution consisting of 0.3 part of 36% aqueous nitric acid solution and 5.2 parts of aqueous hydrogen peroxide solution and then dissolved with stirring for 3 hours at below 10° C. Thus, a solution containing oxytitanic ion and peroxytitanic ion (0.128 mol ion per 1000 g of the solution) was obtained.

The following components were premixed and the mixture was dispersed by ball mill for 24 hours to obtain a base paint.

| Base paint formula: | |
|---|---|
| 40% ES-40 (Trade mark of hydrolyzed ethyl silicate made by Nippon Corcoat Chemical Co., Ltd., Japan) | 25.0 parts |
| Denka Butyral BV#200L (The same as in the example 1) | 7.5 parts |
| Isopropyl alcohol | 30.0 parts |
| Ethyleneglycol monobutyl ether | 18.0 parts |
| Mica powder | 6.0 parts |
| Alumina | 9.0 parts |
| Titanium dioxide | 2.2 parts |

Then, 97.7 parts of the base paint were mixed with 5.5 parts of the above solution to prepare a rust preventive paint of the present invention. The pH of the paint obtained was 1.0. The concentration of oxytitanic ion and peroxytitanic ion in the paint was 0.0029 mol ion per 1000 g of the paint.

EXAMPLE 7

The following monomer mixture containing 0.5 part of di-tert-butyl peroxide was added to 80 parts of xylene with stirring.

| Monomer mixture: | |
|---|---|
| Butyl methacrylate | 54 parts |
| Acrylic acid | 12 parts |
| Styrene | 34 parts |

After the addition, the polymerization was continued for 10 hours at 140° C to obtain an acrylic resin having an acid value of 90 and a number average molecular weight of about 35000. Then 20 parts of n-butyl alcohol was added to the acrylic resin to obtain an acrylic resin varnish containing 50% of non-volatile matter.

The following components were permixed and the mixture was dispersed by ball mill for 12 hours to obtain a base paint.

| Base paint formula: | |
|---|---|
| 50% acrylic resin varnish obtained above | 20 parts |
| Toluene | 235 parts |
| Titanium dioxide | 21.4 parts |
| Aerosil | 5.5 parts |
| (Trade marks of silica sol made by Nippon Aerosil Co., Ltd., Japan) | |
| Carbon black | 1.1 parts |

On the other hand, 3.6 parts of tetraisopropyl titanate cooled to 5° C were added gradually to a mixed solution consisting 17.7 parts of 85% aqueous phosphoric acid solution, 1.3 parts of 35% aqueous hydrogen peroxide solution, 25.8 parts of distilled water and 265 parts of isopropyl alcohol. The mixture solution were stirred for 2 hours at 5° C. Thus, a solution containing peroxytitanic ion (0.041 mol ion per 1000 g of the solution) was obtained.

In this example, a rust preventive paint of the present invention was obtained by mixing 463 parts of the base paint with 313.4 parts of the solution containing peroxytitanic ion immediately before application. The concentration of peroxytitanic ion in the paint was 0.0166 mol ion per 1000 g of the paint. The pH of the paint was 2.6.

Comparative Example 2

A commercial organic zinc rich paint having 90% zinc dust content and containing epoxy resin as a binder was used.

Comparative Example 3

A commercial inorganic zinc rich paint having 75% zinc dust content and containing ethyl silicate as a binder was used.

Comparative Example 4

A commercial etching primer containing vinyl butyral resin as a binder and chromate pigment was used.

Comparative Tests

The metal surface treatment liquids and the rust preventive paints in the foregoing Examples 1 to 7 and Comparative Example 1 to 4 were subjected to various tests, the results of which are shown in the Table 1 and Table 2. With respect to Examples 1 to 3 and Comparative Example 1, the metal surface treatment liquids were applied to various metal substrates by dipping. Then, the coated metal substrates were dried by hot air of 50° and washed with water to form a composite oxide film thereon. On the other hand, the rust preventive paints of Example 4 to 7 and Comparative Example 2 to 4 were applied to metal substrates by spraying and air-dried.

Table 1

| | Substrate | Dipping Time | Surface condition of film | Salt Spray Test | Corrosion Electric Current Density ($\mu$A/cm) | Pencil Hardness |
|---|---|---|---|---|---|---|
| Example 1 | Steel | 1 minute | Yellowish brown | Good | 12.0 | 9H |
| | Aluminum | 1 minute | Silver white | Good | below 10.0 | 9H |
| Example 2 | Steel | 2 minutes | Brown | Good | 10.5 | 9H |
| | Aluminum | 2 minutes | Silver white | Good | below 10.0 | 9H |
| Example 3 | Galvanized Steel | 50 seconds | Blacking gray | Good | 25.0 | 9H |
| | Aluminum | 1 minutes | Silver white | Good | below 10.0 | 9H |
| Comparative Example 1 | Steel | 10 minutes | No film formation | Overall rusty | 145.0 | 7H |

Table 2

| | | | Example | | | | Comparative Example | | | Uncoated Cases |
|---|---|---|---|---|---|---|---|---|---|---|
| | | | 4 | 5 | 6 | 7 | 2 | 3 | 4 | |
| Outdoor Exposure Test | Blasted steel panel | 6 months | No change | No change | No change | No change | No change | No change | 50% rust forming Overall | Overall red rust |
| | | 1 year | No change | 50% rust forming | No change | No change | No change | No change | Overall rust forming Overall | Overall red rust |
| | Rusted steel panel | 6 months | 50% rust forming | No change | No change | No change | 30% rust forming | 10% rust forming | rust forming Blistering Overall | Overall red rust |
| | | 1 year | 10% rust forming | 5% rust forming | 5% rust forming | 5% rust forming | 70% rust forming Partial peeling | 30% rust forming | rust forming, 70% peeling | Overall red rust |
| Over-coat-ability | Chlorinated Rubber Paint | | ◎ | ◎ | ◎ | ◎ | ◎ | ○ | ○ | ○ | X |
| | Vinyl Chloride Resin Paint | | ◎ | ◎ | ◎ | ◎ | ◎ | ○ | ○ | ○ | X |
| | Epoxy Resin Paint | | ◎ | ◎ | ◎ | ◎ | ◎ | ○ | ○ | ◎ | △ |
| | Tar-Epoxy Paint | | ◎ | ◎ | ◎ | ◎ | ◎ | ◎ | ◎ | ◎ | △ |
| | Acryl Resin | | | | | | | | | | |

Table 2-continued

| | Example | | | | | Comparative Example | | | Uncoated Cases |
|---|---|---|---|---|---|---|---|---|---|
| | 4 | 5 | 6 | 7 | | 2 | 3 | 4 | |
| Paint | ◎ | ◎ | ◎ | ◎ | ◎ | ○ | ○ | ○ | X |
| Gas Cutting Speed (Maximum mm/minute) | 1100 | 1100 | 1100 | 1100 | 1100 | 1100 | 1100 | 1100 | 1100 |
| Weldability | Good | Good | Good | Good | Good | Good | Good | Good | Good |

The test methods were as follows:
Surface condition:
Observation was made with the naked eye.
Salt Spray Test;
Observation was made after 240 hours in accordance with JIS z 2371
Corrosion Electric Current Density:
Measurement was made in aqueous 0.6N — ammonium nitrate solution.
Pencil Hardness
The surface of coated substrate was subjected to scratching test by using various kinds (hardness) of pencils.
Outdoor Exposure Test:
The steel panel having the dry paint film thickness of 50 $\mu$ was subjected to outdoor exposure and observation was made with the naked eye after 6 months and after one year.
Overcoatability:
The rust preventive paint was spray-coated to the sand blasted steel panel to obtain the coated panel having the dry film thickness of 50 $\mu$ and then, the topcoats showed in the Table 2 was applied thereto by spraying to obtain the coated panel having the dry film thickness of 100 $\mu$. After the coated panel was immersed in sea water for one year, observation was made with the naked eye.
Notes:
◎ : Very good (no change)
○ : Slightly formation of rust or blistering (usable)
Δ : Blistering, Partially peeling (no practical use).
X : Peeling (no practical use)
Gas Cutting Speed:
The maximum gas cutting speed was measured by cutting the coated panel by cutting machine using acetylene gas. The coated panel was obtained by spray-coating the rust preventive paint to the sand blasted mild steel panel of 13 mm thickness in the dry film thickness of 20 $\mu$.
Weldability:
Welding was made by using the same coated panel as in the Gas Cutting Speed Test and X-ray inspection was made as to the welded part.

In accordance with the above examples and test results, it will be understood that the metal surface treatment liquid and the rust preventive paint of the present invention have excellent properties and is useful.

What is claimed is:

1. In a rust preventive paint comprising a vehicle containing a solvent and at least one member of the group consisting of butyral resin, alkyd resin, phenoxy resin, polybutadiene, phenolic resin, epoxy resin, acrylic resin and hydrolyzed ethyl silicate, and a corrosion inhibiting agent; the improvement comprising, as said agent, 0.0025 to 2.5 ion mol of oxytitanic ion, peroxytitanic ion or mixtures thereof per 1000g of paint, said paint having a pH of less than 6.

2. A metal surface treatment paint as set forth in claim 1, wherein the oxytitanic ion or peroxytitanic ion is obtained in such a manner that titanium compound or metallic titanium is dissolved in inorganic acid solution.

3. A metal surface treatment paint as set forth in claim 2, wherein the titanium compound or metallic titanium is oxidized by the addition of peroxide.

4. A metal surface treatment paint as set forth in claim 3, wherein the said peroxide is hydrogen peroxide.

5. A method of preventing corrosion of a metallic surface which comprises contacting said metal surface with the metal surface treatment paint of claim 1.

6. The method of claim 5 wherein said treatment paint has a pH at a range from 0 to 3.5.

* * * * *